9481X
L. Newton,
Double-Acting Pump.
Patented Mar. 8, 1836.
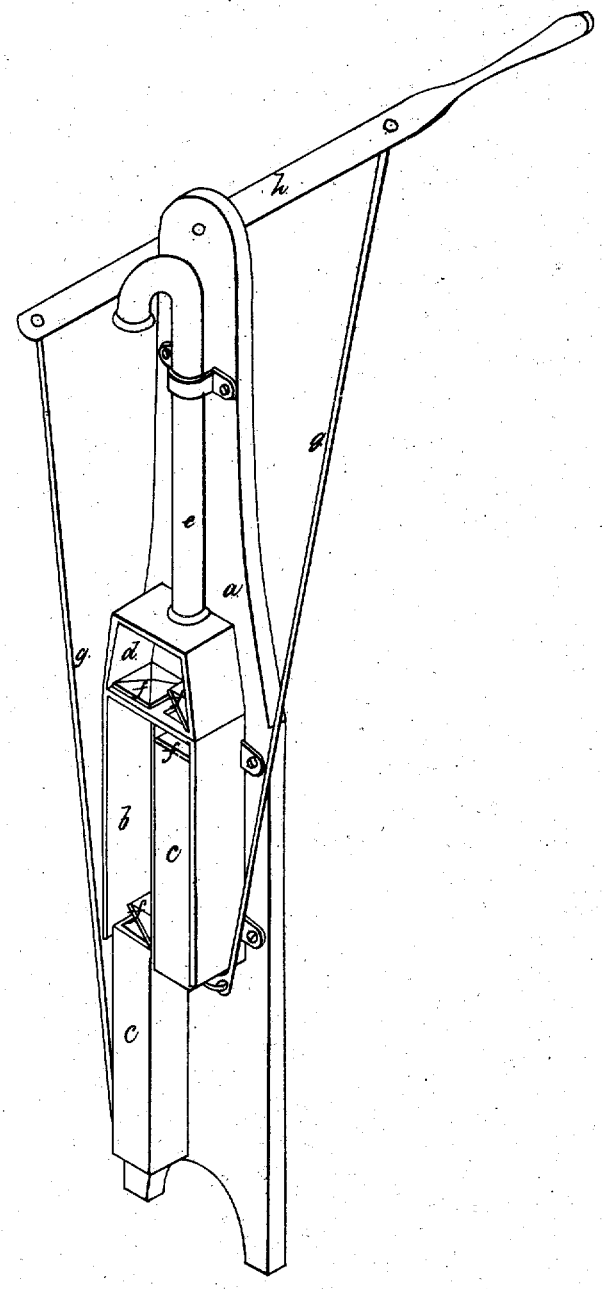
N. PETERS, PHOTO-LITHOGRAPHER, WASHINGTON, D. C.

Mar. 8. 1836 1

9481X

Levi Newton
Letters Patent

The Schedule referred to in these Letters Patent and making part of the same containing a description in the words of the said Levi Newton himself of his improvement in the Double force pump

---

To all to whom these presents shall come. Be it known that I Levi Newton of Alexander in the County of Genesee & State of New York have invented a new and useful improvement in making pumps denominated the Double force Pump & that the following is a full & exact description thereof. The Double Force Pump consists of a conductor or receiver, two cylinders or boxes, two buckets, two pitmen, a standard or lever or crank & four valves. The standard may be made either to rest upon the bottom of the well cistern or reservoir containing the liquid, or to rest upon the top of the same & be of any length or size required & made fast to any part thereof. The two cylinders are of any required length or diameter placed parallel in any position in the liquid and made fast therein. Or two square boxes of equal length & capacity may ~~may~~ be substituted therefor. The receiver is of a conical form of a diameter equal to both the cylinders or boxes and placed upon the heads of the same to receive the liquid forced through them. The conductor is of any required length & shape connected with the head of the receiver to conduct the liquid to the place required. Upon the head of each cylinder or box & within the receiver is a valve to retain the liquid in the receiver when forced into it. The buckets are of such shape & size as to fill the cylinders & extend so far below them as to make a connexion with the pitmen practicable. The buckets are also hollow for the purpose of admitting the liquid through them into the receiver and have each a valve upon their head. These buckets move back & forth alternately in the cylinders and force the liquid into the receiver. The pitmen are two rods attached to the foot of the buckets & connected with the lever in such manner as by the movement of the same to force the buckets up & down in the cylinders. The lever is a bar of any shape or dimensions resting upon the top of the standard & it is

9481X is the part to which the power is applied in case it is used instead of the crank. Instead of the lever a crank may be used for the application of the power. Instead of two pitmen only one may be used to connect with the lever & be connected at the lower end with a [illegible] attached to the standard or otherwise fastened above the receiver which [illegible] is thereby made to move parallel with the lever & do the office of it. All the materials of which the pump is made may be any kind of wood or any metal or any part of either wood or metal. What I claim as my own invention and not previously known in the above described pump is the method of forcing liquids of all kinds into a conductor by means of the cylinders, buckets & receivers as above described Witnesses
H. G. Warner
George Warner Levi [illegible] Newton 574 [illegible]

(Patented 8 March 1836)

Drawing